Figure 2:
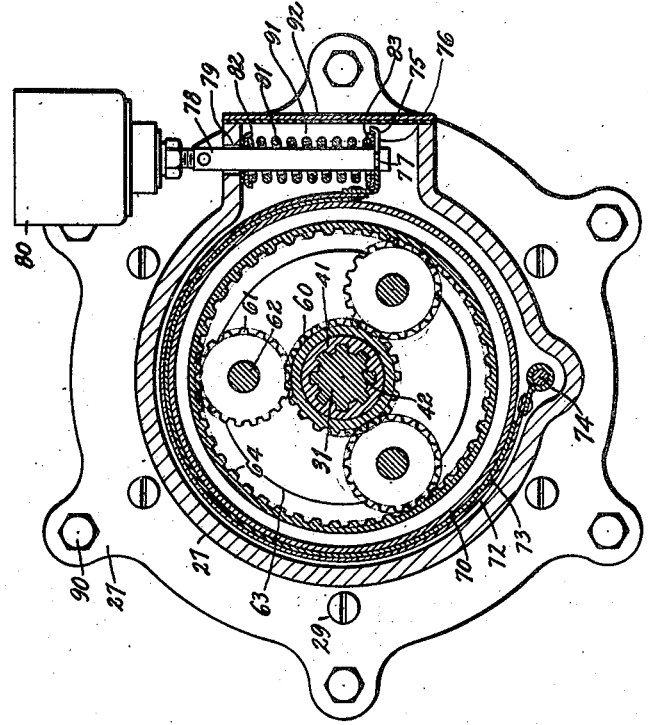

Aug. 24, 1943.    E. M. CLAYTOR    2,327,769
GENERATOR OVERDRIVE
Filed April 2, 1941

INVENTOR
Edward M. Claytor
BY
Spencer Hardman & Fehr
his ATTORNEYS

Patented Aug. 24, 1943

2,327,769

UNITED STATES PATENT OFFICE 2,327,769

GENERATOR OVERDRIVE

Edward M. Claytor, Anderson, Ind., assignor to General Motors Corporation, Detroit, Mich., a corporation of Delaware Application April 2, 1941, Serial No. 386,494

3 Claims. (Cl. 74—290)

This invention relates to movable speed generators and more particularly to generators driven by engines of automotive vehicles.

In my Patent No. 2,266,164, issued December 16, 1941, I disclose a generator driven by an internal combustion engine of an automobile and means for automatically changing the gear ratio between the engine and generator when a certain speed is attained. The purpose of this device is to obtain a relatively high gear ratio at low engine speeds in order that the storage battery may be charged by the generator although the vehicle may be moving at a low rate of speed. At a certain medium vehicle speed, say 25 M. P. H. the gear ratio is automatically changed to a lower value so that, throughout the range of higher engine speeds, the generator speed will not be excessive. In order to provide for this automatic change of gear ratio I provide a two-speed transmission generally known as an overdrive. During the lower range of vehicle speed, the generator is in overdrive; and during the higher range of vehicle speed, the lower speed ratio of the transmission to the generator is automatically established.

It is an object of the present invention to simplify the construction of the parts and the assembling of the parts of the two speed drive of the generator.

Further objects and advantages of the present invention will be apparent from the following description, reference being had to the accompanying drawing wherein a preferred embodiment of the present invention is clearly shown.

Figure 1:
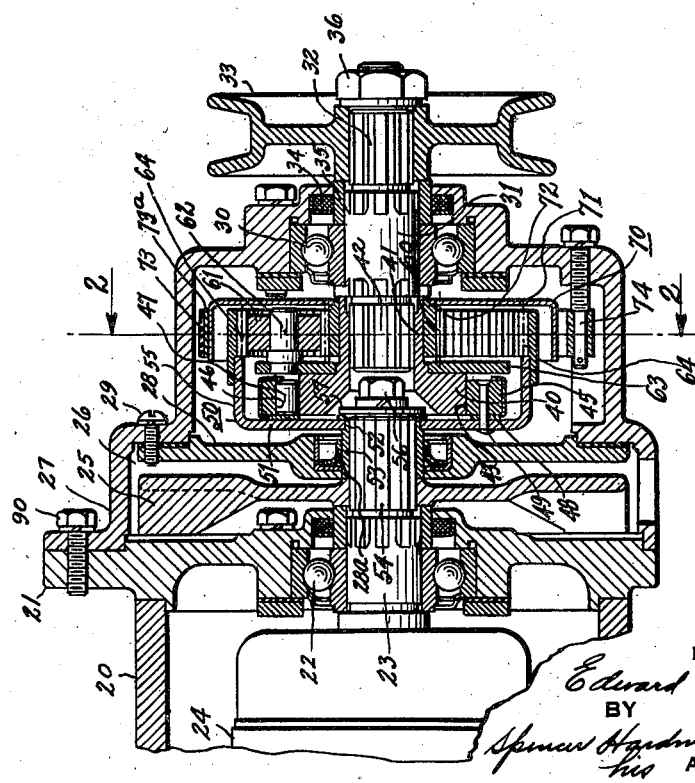

In the drawing:

Fig. 1 is a longitudinal sectional view of my improved two speed drive mechanism for a generator; and Fig. 2 is a sectional view on the line 2—2 of Fig. 1.

In Fig. 1, numeral 20 refers to the generator field frame secured to an end plate 21 supporting a ball bearing 22 within which the generator armature shaft 23 is journalled. The shaft supports the generator armature 24 a fragment of which is shown.

The shaft 23 extends to the right of the bearing 22 and supports a fan 25 for inducing the flow of air around the windings of the armature. The fan 25 is housed in a compartment 26 which is defined by a housing 27 which includes the transmission to be described and a partition plate 28 which, in the final assembly, is attached to housing 27 by screws 29.

Transmission housing 27 supports a ball bearing 30, the inner race of which has a press fit with a drive shaft 31 splinedly connected at 32 with a pulley 33. A bearing seal 34 rides on a spacer ring 35 confined between the inner race of bearing 30 and the hub of pulley 33 which hub is secured in position by the tightening of a nut 36 threaded on the right end of shaft 31.

Shaft 31 is connectible with the shaft 23 directly through an overrunning clutch comprising an inner member 40 and an outer member 45. The inner member 40 is provided with an internally splined hub 41 for engaging external splines 42 of shaft 31. The member 40 has a cylindrical periphery 43 which is journalled within the member 45 having internal cylindrical surfaces interrupted by notches 46. Each notch encloses a clutch roller 47. The outer clutch member 45 and a spacing ring 48 are attached by rivets 49 to a cup shaped member 50, the plane end wall 51 of which is attached at 52 to a hub 53 which drives the shaft 23 through its splines 54. The normal drive or low speed drive of the generator includes pulley 33, shaft 32, inner clutch member 40, outer clutch member 45, cup-shaped member 50, hub 53 and shaft 23.

The overdrive transmission between shafts 31 and 23 will now be described. The hub 41 of clutch member 40 provides a journal for a sun gear 60 which meshes with a plurality of planet gears 61 journalled on studs 62 carried by plate or planet gear carrier 63 attached to and driven by the clutch member 40. The planet gear 61 meshes with an internal ring gear 64 attached to the cylinder periphery 55 of the cup member 50. In order to put the transmission in overdrive it is necessary to prevent rotation of the sun gear 60. This is accomplished by the use of a brake comprising a brake drum 70, the plane end wall 71 of which is attached at 72 to the sun gear 60. The drum 70 cooperates with a brake band 73 having a lining 73a. The band 73 is secured at one end to a fixed pin 74 and at the other end it carries a lug 75 provided with a slot 76 for receiving the grooved end 77 of a rod 78 which extends upwardly through a wall 79 in housing 27, and is attached to the armature not shown of a solenoid unit 80 mounted on the housing 27. Normally the band lining 73a engages the drum 70 through the action of a coil spring 81 surrounding rod 78 and engaging at its upper end a cupped washer 82 urged by the spring against the underside of a wall portion of housing 27. At its lower end, spring 81 engages a cupped washer 83 bearing against the lug 75.

When the engine is operating at a speed within a lower speed range of vehicle speeds, for example, 25 M. P. H. or less, the solenoid unit 80 is inoperative to overcome the spring 81 which maintains the brake band lining 73a, upon the brake drum 70, and thus restrains rotation of the sun gear 60. Therefore the generator will be in overdrive, meaning that the generator is driven by the engine through the transmission and will be in the higher gear ratio status. The overdrive of the transmission includes the following elements: shaft 31, inner clutch member 40, plate 63, studs 62, planet gears 61, internal ring gear 64, cup member 50, hub 53 and shaft 23. When the generator is in overdrive the cup member 50 rotates at a speed greater than the shaft 31 and the clutch member 40. Under these conditions the outer clutch member 45 which is attached to the member 50 overruns the inner member 40.

At some predetermined vehicle speed such as 25 M. P. H., for example, a speed responsive switch (not shown) causes the solenoid 80 to become operative to overcome the spring 81, and to retract the brake band lining 73a from the drum 70. Then the sun gear 60 is released and all of the planetary gearing will rotate at the same rate of speed as the shaft 31. The transmission of power between the shaft 31 and the shaft 23 then takes place through the overrunning clutch 40—45.

By providing a higher gear ratio during the lower speed range of the engine the generator speed is such that the battery will be charged at relatively low vehicle speed. Therefore the battery will be charged at practically the full rate all the time the vehicle is being driven in the city. When driving at a high rate of speed in the country, the generator speed is prevented from being excessive since the transmission is automatically taken out of overdrive and is caused to transmit power from the engine to the generator through a drive of lower gear ratio. The life of the generator is much longer than it would be if the ratio of the drive from the engine to the generator were not reduced.

The present invention provides for the construction of the parts of the transmission in a simple and economical manner and the assembling of these parts is facilitated. The assembling of these parts is as follows: The generator is assembled in the usual manner and the fan 25 is mounted upon the overhanging end of shaft 23 which is provided with the splines 54. The parts of the planetary gearing and the over-running clutch are assembled together in sub-assembly which comprises the cup-shaped member 50 with its internally splined hub 53 and internal gear 64. The clutch rollers 56 and the inner clutch member 40 are assembled with the outer member 45 already secured to the shell 50. The planet gears 61 are placed upon the studs 62 carried by the plate 63 already attached to clutch member 40. Then sun gear 61 with its brake drum 70 is mounted upon the hub 41 of inner clutch member 40. This sub-assembly of planet gears and overrunning clutch is assembled with the partition plate 28 having a seal ring 28a which engages the hub 53 of the shell 50. Then this assembly of parts is assembled with the shaft 23, the splines 54 receiving the internally splined hub 53 of member 50. A screw 56 is introduced by means of a socket wrench through the hub 41 and is screwed into the end of shaft 23 in order to clamp a washer 57 against the hub 53 and thus secure this assembly to this shaft.

To complete this structure another sub-assembly is to be added. This sub-assembly comprises housing 27, bearing 30, shaft 31, pulley 33, brake band 73, spring 81, rod 78 and solenoid unit 80. The solenoid 80 may be energized or a tool may be inserted between the rod 78 and the housing 27 in order to compress the spring 81 beyond its normal state of compression in order that the band lining 73a will clear the drum 70. This sub-assembly of parts is then assembled with the remainder of the structure, the shaft splines 42 passing into the hub 41 of clutch member 40, and the brake band lining 73a passing around the brake drum 70. The housing 27 is then connected directly with the partition plate 28 by the screws 29. Then the housing 27 is secured to the generator end plate 21 by screws 90.

It is not essential that the solenoid unit 80, the spring 81 and the rod 78 be assembled with the structure in advance of assembling the housing 27 with the end frame 21. The frame 27 is provided with an opening at 91 in Fig. 2, through which the spring 81 may be introduced and located around the rod 78, and through which the assembler may work to make the connection between the rod 78 and the lug 76 on the brake band 73.

While the embodiment of the present invention as herein disclosed, constitutes a preferred form, it is to be understood that other forms might be adopted, all coming within the scope of the claims which follow.

What is claimed is as follows:

1. An overdrive transmission comprising a frame part supporting a bearing, a second frame part supporting a bearing in alignment with the first named bearing; means for detachably securing the frame parts together to prevent separation of the bearings, a drive shaft supported by the first bearing, a driven shaft supported by the second bearing; a sub-assembly unit for connecting the shafts and separable as a unit from the shafts; said sub-assembly comprising a one-way clutch having a driving member detachably connected with the driving shaft and maintained in connected relation by the attachment of the frame parts together; and said one-way clutch having a driven member detachably connected with the driven shaft, and said sub-assembly comprising also sun, planet and ring gears; said sun gear being rotatably supported by the driving clutch member, said ring gear being connected with the driven clutch member, a carrier attached to the driving clutch member and pivotally supporting the planet gears; brake means for normally preventing rotation of the sun gear and electromagnetic means operable to control the brake means.

2. An overdrive transmission comprising a frame part supporting a bearing, a second frame part supporting a bearing in alignment with the first named bearing; means for detachably securing the frame parts together to prevent separation of the bearings, a drive shaft supported by the first bearing; a driven shaft supported by the second bearing; a sub-assembly unit for connecting the shafts and separable from the shafts as a unit; said sub-assembly comprising a one-way roller clutch having a driving member and a driven member; the latter surrounding the former; a hub fitting around an end of the driven shaft and drivingly connected therewith; means connecting said hub with the outer and driven member of the clutch; a ring gear carried by said means, a hub provided by the driving member of the clutch and fitting around an end of the driving shaft and connected therewith, said connection being maintained by virtue of connecting the frame parts together, said sub-assembly comprising also a sun gear in the plane of the ring gear and rotatably supported by the hub of the driving member of the clutch, a planet gear carrier attached to the driving member of the clutch, planet gears pivotally supported by the carrier and meshing with the ring gear and sun gear, and a brake drum attached to the sun gear; and a friction element supported by the housing for engaging the brake drum, and electro-responsive means carried by the housing for controlling the friction element.

3. An overdrive transmission comprising a frame part supporting a bearing, a second frame part supporting a bearing in alignment with the first named bearing, a drive shaft supported by the first bearing, means for detachably securing the frame parts together to prevent separation of the bearings, a driven shaft supported by the second bearing; a sub-assembly unit for connecting the shafts and separable from the shafts as a unit, said sub-assembly comprising a one-way roller clutch having a driving member and a driven member the latter surrounding the former, a hub fitting around an end of the driven shaft and drivingly connected therewith, a cup-shaped part having an annular flange and a plane end wall attached to said hub and driven member of the clutch, a ring gear carried by said annular flange, a hub provided by the driving member of the clutch and fitting around an end of the driving shaft and connected therewith, said connection being maintained by virtue of connecting the frame parts together, said sub-assembly comprising also a sun gear in the plane of the ring gear and rotatably supported by the hub of the driving member of the clutch, a planet gear carrier attached to the driving member of the clutch, planet gears pivotally supported by the carrier and meshing with the ring gear and sun gear, and a second cup-shaped member having a flange providing a brake-drum surrounding the ring gear and having a plane end wall attached to the sun gear; and a friction element supported by the housing for engaging the brake drum; and a solenoid carried by the housing and connected with the friction element, said solenoid when actuated releases the friction element from the brake drum.

EDWARD M. CLAYTOR.